Sept. 12, 1944.   C. J. PENTHER ET AL   2,358,027
ELECTROMAGNETIC METHOD AND APPARATUS FOR PIPE
LINE SURVEYING AND EXPLORATION
Filed Jan. 26, 1942

Inventors: Carl J. Penther
Francis B. Rolfson
By their Attorney:

Patented Sept. 12, 1944

2,358,027

UNITED STATES PATENT OFFICE 2,358,027

ELECTROMAGNETIC METHOD AND APPARATUS FOR PIPE LINE SURVEYING AND EXPLORATION

Carl J. Penther and Francis B. Rolfson, Oakland, Calif., assignors to Shell Development Company, San Francisco, Calif., a corporation of Delaware Application January 26, 1942, Serial No. 428,338

2 Claims. (Cl. 175—183)

This invention relates to the art of electromagnetic exploration, and pertains more particularly to a method and apparatus for determining the location of underground conductive bodies and the intensity of electric currents flowing therein.

The present invention is especially well adapted for surveying and measuring electrical phenomena which are of interest in connection with the determination of factors affecting the electrochemical corrosion of underground structures such as pipe lines, and will therefore be described in its application for this purpose, it being understood that it can also be applied for broad purposes of geophysical surveying or exploration, such, for example, as mapping of magnetic contours, location of deposits of ore or petroleum, etc.

In our co-pending application Serial No. 428,337, filed January 26, 1942, directed to an "Electromagnetic method and apparatus for pipe line surveys," we have disclosed a device for detecting a current flowing in a pipe line or other underground conductor, said device comprising two rotating coils, each adapted to generate an electromotive force by intersecting the lines of force of a magnetic field set up by said current at points unequally spaced from said conductor.

Although effective measurements may readily be carried out by means of said apparatus, it must be borne in mind that the latter should be constructed with the greatest care and precision, since various factors, such as even very small differences in the physical shape of the rotating coils, phase shifts caused by small angular displacements of said coils with regard to each other due to elastic torsional lag in the transmission shafts during rotation, etc., may, unless properly eliminated, introduce errors in the readings of the indicating device which would substantially detract from the accuracy of said method.

It is therefore an object of the present invention to provide an electro-magnetic surveying or exploration method and apparatus eliminating the use of moving parts and the errors attendant thereto.

It is also an object of the present invention to provide a method and apparatus whereby magnetic field anomalies due to the presence of conductive underground bodies, or to a flow of electric current in said bodies, as well as the intensity of said current, can be determined by observing magnetic field effects on the high-frequency resistance characteristics of spaced conductor elements of high initial permeability.

These and other objects of this invention will be understood from the following description taken with reference to the attached drawing, wherein.

Figure 1:
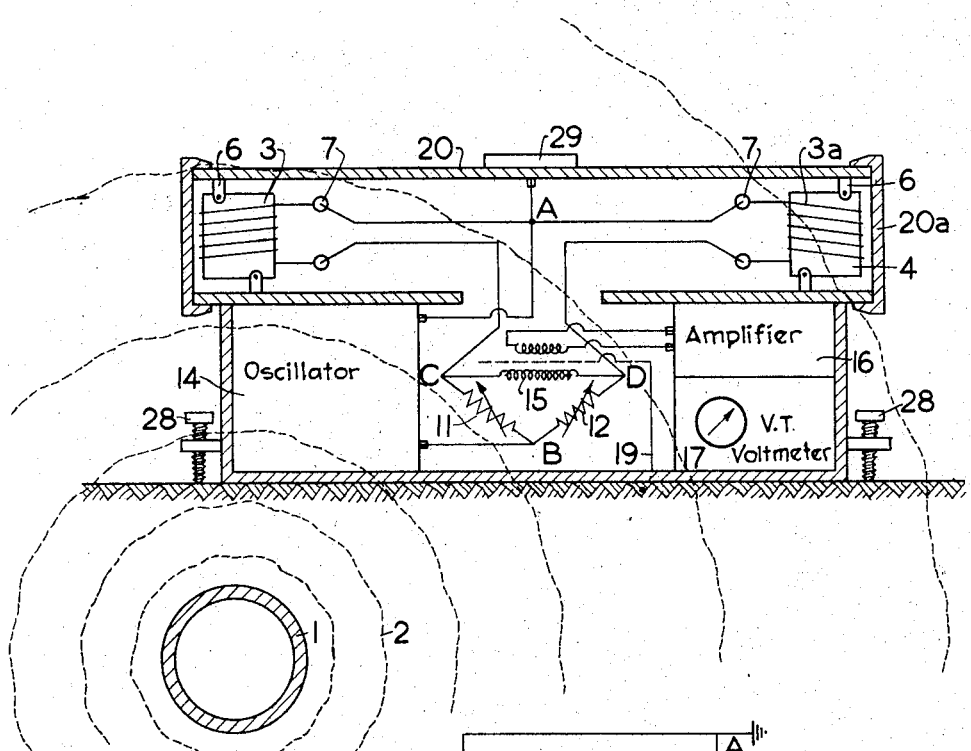
Fig. 1 is a cross-section view diagrammatically showing the electrical circuit of an embodiment of the present invention.
Figure 3:
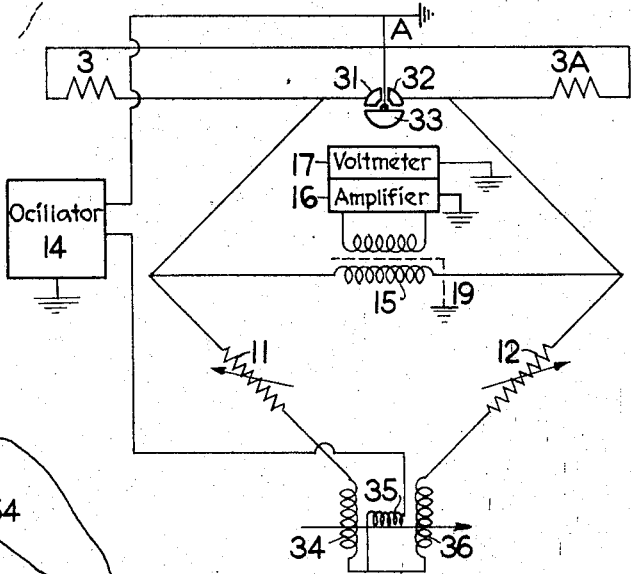
Fig. 3 is a modification of the circuit of Fig. 1.

Referring to Fig. 1, an electric current flowing in a buried pipe line 1 sets up a magnetic field schematically indicated by the lines of force 2. Since the strength of this field is directly proportional to the current flowing in the pipe, the intensity of the current may be determined by measuring the strength of the field by means of suitably calibrated devices.

Since, however, the magnetic field due to currents of such intensity as are usually flowing in pipe lines is extremely weak, as compared to the earth magnetic field, being, for example, often of the order of one-thousandth thereof, it is necessary to eliminate or to balance out the effect of the earth magnetic field on the measuring apparatus in order that said earth field effects do not completely obscure the relatively very small effects of the pipe line magnetic field.

It is therefore proposed, according to the present invention, to make use of a measuring system comprising two substantially identical elements sensitive to magnetic field phenomena. These two elements are separated in space, one of them being placed in the closest proximity obtainable under given local conditions to a current-carrying pipe line, and the other being placed at a distance from the pipe line where the effects of the pipe line field on said element are considerably smaller and sometimes even negligible.

These two elements are connected to the indicating or measuring device as adjacent arms of a bridge circuit. In this way, the effect of the earth magnetic field, being equal on both elements, may be balanced out without affecting the indicating device, while the effect of the pipe line magnetic field, being at or near a maximum for one of the elements, and considerably smaller for the other element, will result in an indication of the registering device which is not affected, masked, or obscured by the super-imposed earth field effect.

It is understood that the existence of two difplaced over a buried or uncovered pipe line carrying a current which it is desired to determine. The casing 20 is placed and adjusted to a true horizontal position by means of level 29 and screws 28 in such a manner that element 3 is directly over the pipe line, while a plane passing through elements 3 and 3a is at right angles to the axis of the pipe line. As will be shown below, the fact that this optimum position has been reached is automatically indicated by the registering device, which will at that moment give a maximum reading.

The magnetic field surrounding the pipe line will act to modify the permeability, and therefore the resistance or impedance to high-frequency alternating currents of coil 3, while exerting a substantially smaller effect on coil 3a, due to the spacing of said coil from the pipe line.

Any change in the high-frequency resistance of coil 3 will cause a state of unbalance in the bridge circuit, which will be picked up by the transformer 15 and, after passing through amplifier 16, will be indicated by the vacuum tube voltmeter 17.

By suitably calibrating the apparatus, the intensity of the electric current flowing in the pipe line may thus be accurately determined by the present magnetic method. In order for the present device to be suitably calibrated for current, the distance from the pipe to the sensitive element must be known or determined, and the device must have a definite position in space with regard to the pipe. As stated above, the most effective position is that in which one sensitive element is directly over the pipe, while a horizontal line passing through the two elements is at right angles to the axis of the pipe, the existence of this condition being indicated by a maximum reading of the indicating device.

Where the depth of the pipe line is not known from other sources, it may be readily determined by first obtaining the maximum reading, and subsequently moving the whole device along the line passing through the two elements at right angles to the axis of the pipe until a reading equal to one-half of the maximum reading is obtained, whereupon the depth of the pipe may be determined from straight geometrical relations.

By checking the response of the present device to the effect of a direct current passing through a conductor in a known direction, the direction of the current flowing in the pipe line may also be determined in a manner well known in the art.

The arrangement or construction of the device shown in Fig. 1, or that of any component parts thereof may be readily modified without departing from the principle of this invention. Thus, the wirings of elements 3 do not necessarily have to be mounted on flat strips 4, but may be given any other desired shape, including that of linear conductor of a suitable length. They may likewise be constructed in the form of coils having magnetic metal cores. In such case, the cores, rather than the wiring thereon, are made of a high initial permeability metal, such as listed hereinabove, and changes of the impedance of the device will be due to a change not of the resistance, but of the inductive reactance of said elements in response to magnetic field variations. In such case also, audio frequencies, rather than radio frequencies, should be used to operate the device.

Figure 2:
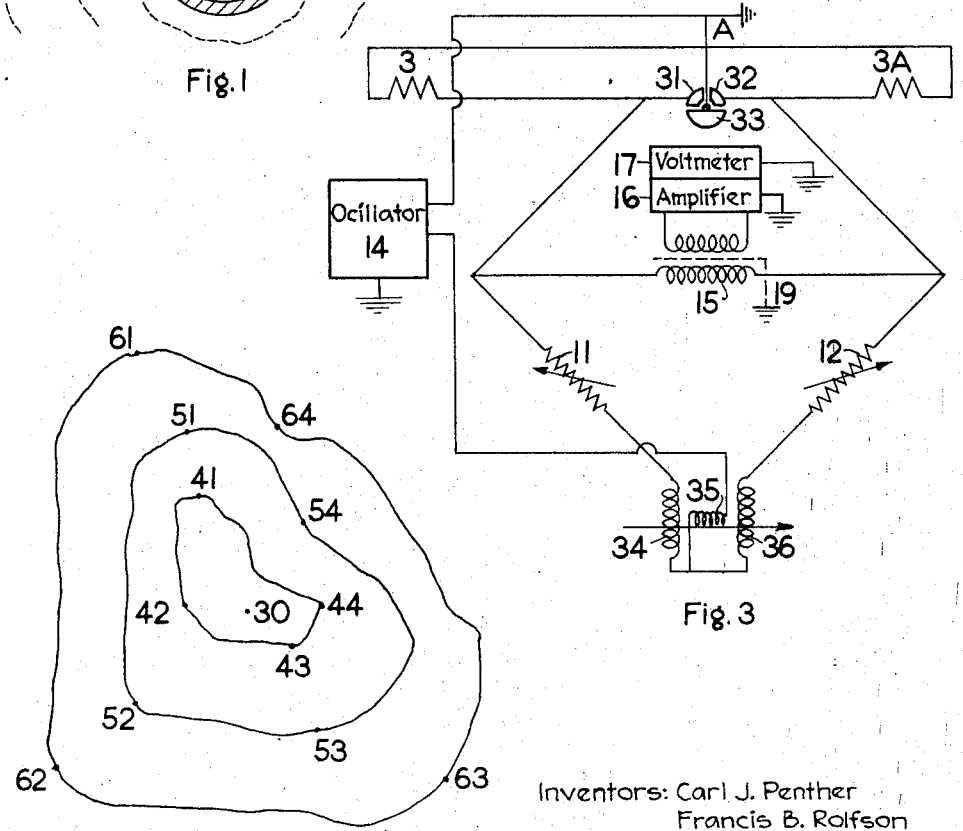
Fig. 2 is an electro-magnetic contour map drawn according to the present invention.

When it is desired to use the apparatus of the present invention for purposes of geophysical exploration, magnetic surveys, etc., it may be desirable to give the elements 3 and 3a a wider spacing than permitted by the size of the apparatus shown in Fig. 1. In such case, the end covers 20a of the casing 20 may be removed, the elements 3 and 3a disconnected at switches 7, the elements 3 and 3a withdrawn from the casing and reconnected to the switches 7 by means of extension leads having any desired length, from a few to several hundred feet. In this manner relatively slow variations of the magnetic field occurring over considerable distances in a given locality may be measured. For example, referring to Fig. 2, which shows schematically a magnetic contour map obtained by means of the present apparatus, the element 3 may be left stationary at a point 30, which serves as a reference point, while element 3a is moved to stations such as 41—44, 51—54, 61—64, etc., to establish isomagnetic contour lines.

In a similar way, magnetic field anomalies due to the presence of bodies having conductivity properties differing from those of the surrounding media, to interface effects of contacting ground layers, to geological faults, surface irregularities, etc., may likewise be determined and measured by means of the present apparatus.

We claim as our invention:

1. In a method for magnetically determining direct currents flowing in a pipe line, the steps of connecting two linearly spaced substantially non-reactive conductor elements having high initial permeability characteristics in a measuring bridge circuit, passing a high-frequency alternating current through said measuring circuit, vectorially balancing said measuring circuit, disposing said conductor elements along a horizontal line transverse to the pipe line with one of said conductors being positioned substantially directly over said pipe line, whereby said conductors are unequally spaced from the axis of said pipe line, and indicating the unbalance occurring in said measuring circuit substantially due to the unequal effect of the direct current magnetic field of the pipe line on the high frequency resistance of said two high initial permeability conductor elements.

2. In an apparatus adapted to be positioned near a pipe line for magnetically determining the electric currents flowing therein, a measuring bridge circuit comprising two linearly spaced substantially non-reactive conductor elements made of a material having high initial permeability characteristics, means for passing a high-frequency alternating current through said circuit, means for vectorially balancing said circuit, means for levelling said elements in a horizontal plane, and indicating means for comparing the relative changes of the high frequency resistances of said two high initial permeability elements substantially due to the unequal effect thereon of the direct current magnetic field of said pipe line when said elements are positioned in a horizontal plane above said pipe line at unequal distances from the axis of said pipe line.

CARL J. PENTHER.
FRANCIS B. ROLFSON.